Oct. 20, 1936.  A. T. SEBEK  2,057,848
NIPPLE CLOSURE
Filed Nov. 6, 1933
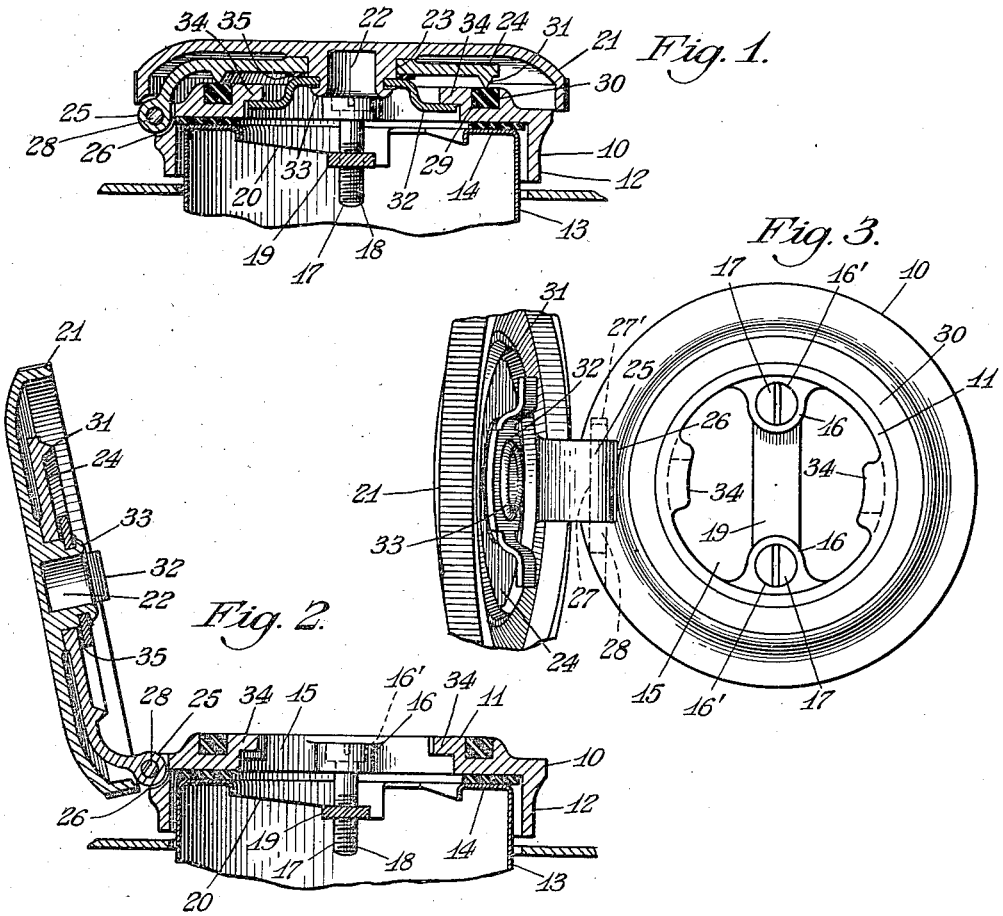
Albert T. Sebek
INVENTOR.
BY Threedy and Cannon
HIS ATTORNEYS.

Patented Oct. 20, 1936

2,057,848

UNITED STATES PATENT OFFICE 2,057,848

NIPPLE CLOSURE

Albert T. Sebek, Chicago, Ill., assignor to Central Die Casting and Manufacturing Company, Inc., Chicago, Ill., a corporation of Illinois Application November 6, 1933, Serial No. 696,818

1 Claim. (Cl. 220—24)

My invention relates to nipple closures particularly designed and adapted for association with the nipple of an automobile radiator or the like and has for its principal object the provision of an improved structure of this character which will be economical in manufacture and highly efficient in use.

Among the several objects of my invention is the provision of a nipple closure constructed in a manner such as will prevent unauthorized removal of the closure from the nipple. In this connection, nipple closures for automobile radiators are usually of an ornamental design or designed to support an ornamental object and as such the cap and ornamental object are invariably the subject of theft. To prevent this I provide a nipple closure embodying a connecting structure which, when the closure is disposed in a closed position with respect to the nipple, is concealed, thus discouraging theft and serving to prevent the removal of the closure and its ornamental object by the use of tools.

Another object of the invention is to provide a nipple closure of a structure such as will permit expeditious opening and closing of the closure cap and which will effectively latch the cap in closed position with respect to the nipple in a manner such as will resist opening movement of the cap by vibration of the vehicle.

Other objects will appear hereinafter.

The invention consists in the novel combination and arrangement of parts hereinafter described and claimed.

The invention will be best understood by reference to the accompanying drawing, showing the preferred form of construction and in which:

Fig. 1 is a sectional detail view of the invention illustrating the same in applied position upon a nipple of a radiator;

Fig. 2 is a sectional detail view of the invention as shown in Fig. 1, with the cap in open position;

Fig. 3 is a plan view of the invention as shown in Fig. 2; and

Fig. 4 is a sectional detail view of the connecting collar or ring embodied in the invention:

In accomplishing the objects hereinbefore recited, I have not lost sight of the fact that simplicity of structure is an object of equal importance. Therefore, to accomplish these, and other objects of my invention, I provide a nipple collar or ring 10 having a top wall 11 from which depends the flange 12 embracing the upper end of the nipple 13 with the top wall 11 seated upon a sealing washer 14 disposed between the top wall 11 and the inturned flange 14 of the nipple 13.

The top wall 11 is provided with a central opening 15 disposed in alignment with the passage of the nipple 13. Projecting into this opening 15 and formed preferably as an integral part of the top wall 11 are oppositely disposed lugs or ears 16 each having countersunk perforations 16' as shown.

Projected through the perforations of the lugs 16 are head bearing bolts 17, the heads of which are seated in the countersunk portions of the perforations 16'. The thread bearing ends 18 of these bolts extend into the nipple as shown and are adapted to carry a clamp plate 19.

To effectively and permanently connect the nipple collar 10 to the nipple 13 the bolts 17 are rotated in a direction to draw this clamp plate 19 against the beveled edges of the wings 20.

The screw slots of these bolts may be filled with any suitable material such as solder or the like to prevent their retraction by means of a tool or to accomplish this the ends of the bolts may be swedged over upon themselves.

The cap of the nipple closure is indicated at 21 and includes a centrally located hollow boss 22 which is rotatably mounted in an opening 23 formed in a plate 24.

This plate 24 provides at one end portion a knuckle 25 adapted to engage in a slot 26 provided by the nipple collar 10.

Communicating with the slot 26 is a recess 27 closed at one end as at 27'. Mounted in this recess 27 is a pin 28 projected through the knuckle 25 to effectuate connection between the plate 24 and the nipple collar 10.

Inasmuch as the recess 27 is closed at one end it is manifest that once the pin 28 is in position with respect to the knuckle it cannot be removed thus preventing unauthorized removal of the cap.

Formed in the top wall 11 is a recess 29 in which is mounted a sealing ring 30. The plate 24 provides an annular rib 31 which engages and bears against this sealing ring thereby resulting in an effective seal when the cap 21 is in closed position with respect to the nipple collar.

The inner end portion of the boss 22 is reduced in diameter and this reduced end portion is projected through an opening formed in a latch plate 32 which latch plate with the cooperation of the boss completes the rotatable connection between the cap and its supporting plate 24. To complete the connection between the boss and the latch plate 32 the end of the boss is swedged over as at 33 upon the latch plate 32.

Formed on the top wall 11 and projecting into the opening 15 are oppositely disposed lips 34 beneath which the ends of the latch plate are adapted to engage to latch the cap 21 in closed position with respect to the nipple collar. These lips provide stop shoulders 34' which limit movement of the latch plate in one direction.

Means may be provided to create a friction between cap 21 and the plate 24, of a degree such that the cap will not tend to rotate relative to the plate 24 by vibration. In this instance I have provided a friction and seal washer 35 mounted as shown upon the boss 22 between the latch plate and the plate 24.

The nipple closure embodying my invention is connected to the nipple in the following manner:

The nipple collar 10 is securely connected to the nipple 13 by the wedging engagement of the clamp plate 19, against the adjacent edges of the wings 20. The cap as hereinbefore described is rotatably carried by the plate 24 and when in closing position with respect to the nipple 13 the ends of the latch plate 32 engage beneath the lips 34. Thus upon rotation of the cap 21 in an anti-clockwise direction (Fig. 3) the ends of the latch plate are disengaged from the lips 34, 32 in a position to permit the cap to be pivoted through a vertical plane into non-closing position with respect to the nipple 13 by movement of the hinge plate 24. It is therefore manifest that by the structure herein set forth the cap can be expeditiously moved from and into closing position with respect to the nipple.

The cap 21 may be formed as a part of or have permanently secured thereto an ornamental object and inasmuch as the connecting structure between the nipple and the nipple collar is incapable of removal by means of tools the cap and its ornamental object cannot be feloniously removed.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

A closure structure comprising: a collar member having a central opening formed therein; said collar member having latching elements formed thereon; said latching elements projecting into said central opening and being arranged radially therearound; a clamping plate extending diametrically relative to and across said central opening below the latter; means for supporting said clamping plate from said collar member; a cap; a substantially annular plate arranged between said collar member and cap; means for pivotally or hingedly connecting said annular plate to said collar member at a point on the external periphery of the latter; means for swively or rotatably attaching said cap to said plate centrally of the latter including radially arranged latch members carried by said swivelling means and latchable with said latch elements below the latter, by rotation of said cap, to latch said annular plate to said collar member; said collar member having an annular groove formed therein in its upper surface; a sealing ring in said groove; and said plate having an annular rib formed integrally therewith on the bottom surface thereof and said rib having sealing engagement with said sealing ring when said cap and plate are in closed position relative to said collar member.

ALBERT T. SEBEK.